US009572059B2

(12) United States Patent
Tabet et al.

(10) Patent No.: US 9,572,059 B2
(45) Date of Patent: Feb. 14, 2017

(54) MISSED RANK REPORT IN DUAL NETWORK RADIO RESOURCE MANAGEMENT

(71) Applicant: Apple Inc., Cupertino, CA (US)

(72) Inventors: Tarik Tabet, Los Gatos, CA (US); Navid Damji, Cupertino, CA (US); Sreevalsan Vallath, Dublin, CA (US); Sarma V. Vangala, San Jose, CA (US); Samy Khay-Ibbat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/940,154

(22) Filed: Jul. 11, 2013

(65) Prior Publication Data

US 2014/0016490 A1    Jan. 16, 2014

Related U.S. Application Data

(60) Provisional application No. 61/670,589, filed on Jul. 11, 2012.

(51) Int. Cl.
*H04W 24/10* (2009.01)
*H04W 72/12* (2009.01)
*H04B 7/06* (2006.01)
*H04L 1/00* (2006.01)

(52) U.S. Cl.
CPC ............ *H04W 24/10* (2013.01); *H04B 7/063* (2013.01); *H04B 7/0626* (2013.01); *H04B 7/0639* (2013.01); *H04L 1/0026* (2013.01); *H04L 1/0027* (2013.01); *H04W 72/1215* (2013.01); *H04W 72/1284* (2013.01)

(58) Field of Classification Search
CPC .... H04B 7/0482; H04B 1/3816; H04W 36/30; H04W 24/00; H04W 80/04; H04L 47/10; H04H 60/33
USPC ...... 370/252, 328, 332; 455/452.1, 517, 558
See application file for complete search history.

(56) References Cited

U.S. PATENT DOCUMENTS

| | | | | |
|---|---|---|---|---|
| 8,358,629 | B2* | 1/2013 | Grilli | H04W 36/0088 370/331 |
| 8,582,638 | B2* | 11/2013 | Earnshaw | H04L 1/0026 375/240 |
| 2011/0142144 | A1 | 6/2011 | Allpress et al. | |
| 2011/0149765 | A1 | 6/2011 | Gorokhov et al. | |
| 2011/0194504 | A1 | 8/2011 | Gorokhov et al. | |
| 2011/0249578 | A1* | 10/2011 | Nayeb Nazar | H04L 1/0027 370/252 |
| 2012/0113866 | A1* | 5/2012 | Tenny | H04W 24/10 370/254 |

(Continued)

*Primary Examiner* — Andrew Lai
*Assistant Examiner* — Chuong M Nguyen
(74) *Attorney, Agent, or Firm* — Downey Brand LLP

(57) ABSTRACT

A method for handling a missed rank report during a tune-away period is provided. The method can include a wireless communication device tuning away from a first network to a second network for a tune-away period; returning to the first network from the tune-away period; determining that a scheduled rank report was missed during the tune-away period; generating a Channel State Indicator (CSI) report based on a previously defined Rank Indicator (RI) value known to the first network in response to missing the scheduled rank report; and sending the CSI report to the first network.

20 Claims, 13 Drawing Sheets

(56) References Cited

U.S. PATENT DOCUMENTS

| | | | |
|---|---|---|---|
| 2012/0140708 A1* | 6/2012 | Choudhury | H04W 72/082 |
| | | | 370/328 |
| 2012/0294173 A1* | 11/2012 | Su et al. | 370/252 |
| 2012/0320783 A1 | 12/2012 | Wu et al. | |
| 2013/0023275 A1* | 1/2013 | Mutya | H04W 88/06 |
| | | | 455/452.1 |
| 2013/0287139 A1* | 10/2013 | Zhu | H04N 21/2365 |
| | | | 375/295 |

* cited by examiner

MISSED RANK REPORT IN DUAL NETWORK RADIO RESOURCE MANAGEMENT

CROSS-REFERENCE TO RELATED APPLICATIONS

This application claims priority to U.S. Provisional Patent Application No. 61/670,589, filed on Jul. 11, 2012, which is incorporated herein in its entirety by reference.

FIELD OF THE DESCRIBED EMBODIMENTS

The described embodiments relate generally to wireless communications technology, and more particularly to handling a missed rank report during a tune-away period in a dual network radio resource management system.

BACKGROUND

Wireless networks continue to evolve as new communication technologies are developed and deployed. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs. Wireless network operators can deploy new communication technologies in parallel with earlier generation communication technologies, and can support multiple communication technologies simultaneously to provide smooth transitions through multiple generations of wireless communication devices. For example, in some deployments, LTE and other new RATs may not fully support some services that can be handled by legacy networks. Accordingly, LTE networks are often co-deployed in overlapping regions with legacy networks in an arrangement sometimes referred to as a "simultaneous" wireless network deployment, and wireless communication devices can transition between co-deployed RATs as services and/or coverage may require. For example, in some "simultaneous" wireless network deployments, LTE networks can support packet switched communications, but are not capable of supporting circuit switched voice calls. Thus, when a wireless communication device receives or initiates a circuit switched voice call while connected to an LTE network that supports packet switched sessions, but not voice calls, the wireless communication device can transition to a simultaneously deployed legacy network, such as Third Generation Partnership Project 2 (3GPP2) Code Division Multiple Access 2000 (CDMA2000) 1x (also referred to as "1xRTT" or "1x") that supports voice calls.

Dual chip, or dual radio, wireless communication devices can include separate radios (e.g., separate signal processing chips) that each can support a different wireless communication protocol, such as one radio for supporting connections to CDMA2000 1x wireless networks and another radio for supporting connections to LTE networks. In particular, in a dual chip wireless communication device, each radio can include its own receive signal processing chain, including in some instances multiple receive antennas and attendant signal processing blocks for each radio. With separate receive antennas available to each radio in the dual chip wireless communication device, pages can be received independently from two different wireless networks, such as from the CDMA2000 1x wireless network and from the LTE wireless network, by the dual chip wireless communication device. Even when the dual chip wireless communication device is connected and actively transferring data through one of the radios to one of the wireless networks, such as the LTE wireless network, the dual chip wireless communication device can also listen for and receive a paging message through the other parallel radio chip from a second wireless network, such as the CDMA2000 1x wireless network. Thus, the dual chip wireless communication device can establish a device originating or device terminated circuit switched voice connection through the CDMA2000 1x wireless network while also being actively connected to (or simultaneously camped on) the packet switched LTE wireless network.

However, the implementation of multiple radios on dual chip wireless communication devices can result in increased power consumption, can require a larger physical form factor and can require additional components that can increase production costs. As such, many wireless communication devices use a single radio to support operation on multiple cellular RATs. Such devices are often referred to as "single radio," or "single chip" devices. For example, some wireless communication devices use a single radio to support operation on both LTE and CDMA2000 1x networks. The use of a single radio for multiple RATs makes transitioning between networks, such as in response to a page message for an incoming voice call or circuit switched service, more complex. In this regard, while a single radio wireless communication device can support connections via multiple RATs, a single radio wireless communication device can only connect to a single network at any given time. For example, a single radio wireless communication device can be able to connect to or camp on the evolved Universal Mobile Telecommunications System (UMTS) Terrestrial Radio Access Network (eUTRAN) of the LTE network or the radio access network (RAN) of the CDMA2000 1x network, but not to both networks simultaneously. As such, a single radio wireless communication device can be unable to receive signals from a second network while actively connected to a first network, particularly when multiple antennas can be used to receive a single communication technology. Thus, when actively connected to an LTE network that does not support a circuit switched fall back (CSFB) mode or Voice over LTE (VoLTE) connections, the single radio wireless communication device can be unable to receive a page from a CDMA2000 1x network when connected to or camped on the eUTRAN of the LTE network.

Given the inability to communicate simultaneously to multiple networks, a technique has been developed whereby a single radio wireless communication device can achieve similar functionality to a dual chip wireless communication device, such that a single radio wireless communication device can retain the ability to complete a circuit switched voice connection through a network, such as an CDMA2000 1x network, when connected to or camped on another network, such as an LTE network. In this regard, a single radio wireless communication device can periodically tune one or more receivers from a first wireless network to a second wireless network in order to listen for paging messages addressed to the wireless communication device from the second wireless network during what is referred to as a "tune-away period." The first wireless network can suspend allocation of radio resources to the wireless communication device during the tune-away period based on receipt of a suspension message from the wireless communication device, based on knowledge of a paging cycle for wireless communication device in the second wireless network, and/or based on detection of an out of synchronization condition with the wireless communication device. However, as the wireless communication device can be unable to receive or transmit on the first network during the tune-away period, the wireless communication device can miss a scheduled period(s) for signaling reporting messages that can be used by the first network for resource (e.g., uplink and/or downlink resource) scheduling for the device. A missed report by the wireless communication device during a tune-away period can negatively impact scheduling for the device, and, in some instances can result in the first network not scheduling any resources or scheduling only very limited resources for the device for some time after the device has returned from the tune-away period.

SUMMARY OF THE DESCRIBED EMBODIMENTS

Some embodiments disclosed herein provide for handling missed report messages, such as a missed rank report, during a tune-away period in a dual network radio resource management system. In this regard, a wireless communication device in accordance with some example embodiments can be configured to use a previously defined Rank Indicator (RI) value known to a first network to generate a Channel State Indicator (CSI) report, such as a Precoding Matrix Indicator (PMI) and/or Channel Quality Indicator (CQI) report, after returning to the first network from a second network following a tune-away period in an instance in which a scheduled rank report is missed during the tune-away period. The first network can accordingly interpret CSI reports received following return of the wireless communication device from the tune-away period even though the scheduled rank report was missed. As such, the first network can perform downlink scheduling for the wireless communication device of such example embodiments following the tune-away period without waiting until the next scheduled rank report. User experience can accordingly be improved due to faster network responsiveness and better throughput for data sessions following a tune-away.

In a first embodiment, a method for handling a missed rank report during a tune-away period is provided. The method of the first embodiment can include a wireless communication device tuning away from a first network to a second network for a tune-away period; returning to the first network from the tune-away period; determining that a scheduled rank report was missed during the tune-away period; generating at least one CSI report based at least in part on a previously defined RI value known to the first network in response to missing the scheduled rank report; and sending the at least one CSI report to the first network.

In a second embodiment, a wireless communication device is provided. The wireless communication device of the second embodiment can include a radio and processing circuitry coupled to the radio. The radio can be configured to support communication with a first network and with a second network. The processing circuitry can be configured to control the wireless communication device of the second embodiment to at least tune the radio away from the first network to the second network for a tune-away period; tune the radio back to the first network to return from the tune-away period; determine that a scheduled rank report was missed during the tune-away period; generate at least one CSI report based at least in part on a previously defined RI value known to the first network in response to missing the scheduled rank report; and send the at least one CSI report to the first network.

In a third embodiment, a computer program product for handling a missed rank report during a tune-away period is provided. The computer program product of the third embodiment can include at least one non-transitory computer readable storage medium having program code stored thereon. The program code of the third embodiment can include program code for tuning away from a first network to a second network for a tune-away period; program code for returning to the first network from the tune-away period; program code for determining that a scheduled rank report was missed during the tune-away period; program code for generating at least one CSI report based at least in part on a previously defined RI value known to the first network in response to missing the scheduled rank report; and program code for sending the at least one CSI report to the first network.

In a fourth embodiment, an apparatus for handling a missed rank report during a tune-away period is provided. The apparatus of the fourth embodiment can include means for tuning away from a first network to a second network for a tune-away period; means for returning to the first network from the tune-away period; means for determining that a scheduled rank report was missed during the tune-away period; means for generating at least one CSI report based at least in part on a previously defined RI value known to the first network in response to missing the scheduled rank report; and means for sending the at least one CSI report to the first network.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

As discussed above, a missed report by the wireless communication device during a tune-away period can negatively impact scheduling for the device, and, in some instances can result in the first network not scheduling any resources or scheduling only very limited resources, such as a modulation and coding scheme (MCS) of 1 or 0, for the device for some time after the device has returned from the tune-away period. For example, in some wireless networks, such as LTE networks, the periodic report of CSI can be based on high layer parameters that specify defined offsets and periods for reporting various CSI, such as a rank report (e.g., an RI), Precoding Matrix Indicator (PMI), Channel Quality Indicator (CQI), and/or the like. While RI, PMI, and CQI reports can be transmitted in different subframes over a given period, these reports can be linked. For example, the PMI can be generated based on a last reported RI value, while CQI values can be generated based on both a last reported RI value and the PMI value. In a dual network radio resource management system, the tune-away feature may result in a periodic rank report being missed during a tune-away duration. As such, a wireless communication device can be unable to report a present RI value, and the network can be unable to interpret subsequent PMI/CQI reports within the RI reporting period, as the network can have to have knowledge of the RI value based upon which the PMI/CQI reports were generated in order to interpret the reported PMI and CQI. Therefore, in the case of a missed rank report, any opportunity to schedule resources for a wireless communication device that has returned from a tune-away period can be lost at least until the next scheduled rank report.

Figure 1:
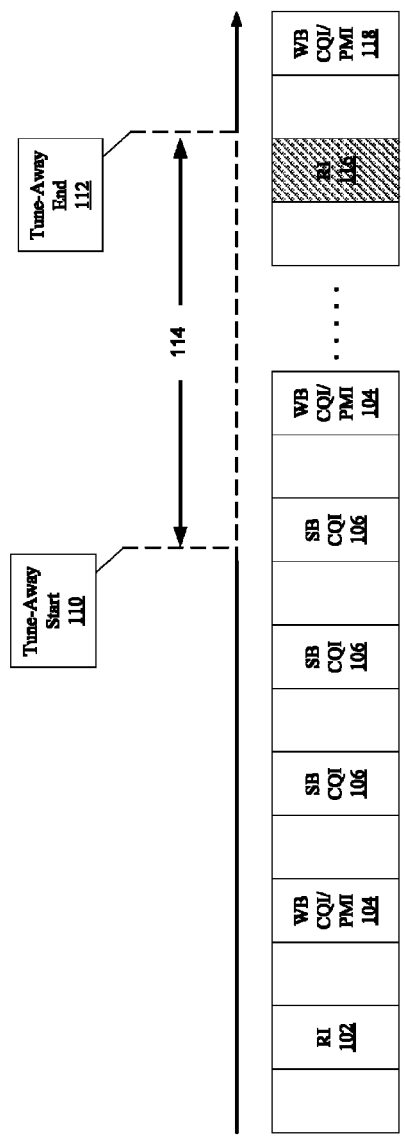
FIG. 1 illustrates an example missed rank report during a tune-away period.

FIG. 1 illustrates an example missed rank report on a Physical Uplink Control Channel (PUCCH) during a tune-away period. In the example of FIG. 1, the wireless communication device can send a rank report 102 indicating a present RI value while connected to a first network. Wideband (WB) CQI/PMI reports 104 and sub-band (SB) CQI reports 106 can be generated based on the based on the RI value reported in the rank report 102. The wireless communication device in the example of FIG. 1 can tune-away from the first network to a second network at time 110 for a tune-away period, and can return the tune-away period at time 112. As such, the tune-away period can have the duration 114. A scheduled periodic rank report 116 can be missed, as the scheduled rank report 116 can fall during the (e.g., collide with) duration 114 of the tune-away period. The WB CQI/PMI report 118 can be the first report after the tune-away period, and can be generated on the basis of the RI value that otherwise would have been reported attendant to the scheduled periodic rank report 116 if not for the tune-away event. The first network can be unable to interpret the WB CQI/PMI report 118, as it is unaware of the RI value based upon which it was generated. As such, even after returning from the tune-away period at time 112, the first network may not schedule resources for the wireless communication device at least until after the next scheduled rank report. In many configurations, rank reports are scheduled every 80 milliseconds. However, a network may not begin scheduling for a wireless communication device until after receiving both an RI report and a CQI report. As such, the effects of a missed rank report can, in many instances, last on the order of 120 milliseconds after returning from a tune-away period. Given that tune-away periods often have a duration on the order of 100 milliseconds or more, a wireless communication device can suffer from a total loss of downlink resources for a time period on the order of 220 milliseconds in the event that a rank report is missed during a tune-away period. This period without downlink resources can adversely affect user experience.

Some example embodiments address the problem of a missed rank report by providing a solution by which a network can interpret CSI reports sent by a wireless communication device after returning from a tune-away period that caused a missed rank report without waiting until the next scheduled rank report. In this regard, a wireless communication device in accordance with some example embodiments can be configured to use a previously defined Rank Indicator (RI) value known to a first network to generate a Channel State Indicator (CSI) report, such as a Precoding Matrix Indicator (PMI) and/or Channel Quality Indicator (CQI) report, after returning to the first network from a second network following a tune-away period in an instance in which a scheduled rank report is missed during the tune-away period. The first network can accordingly interpret CSI reports received following return of the wireless communication device from the tune-away period even though the scheduled rank report was missed. As such, the first network can perform downlink scheduling for the wireless communication device of such example embodiments following the tune-away period without waiting until the next scheduled rank report. User experience can accordingly be improved due to faster network responsiveness and better throughput for data sessions following a tune-away.

Figure 2:
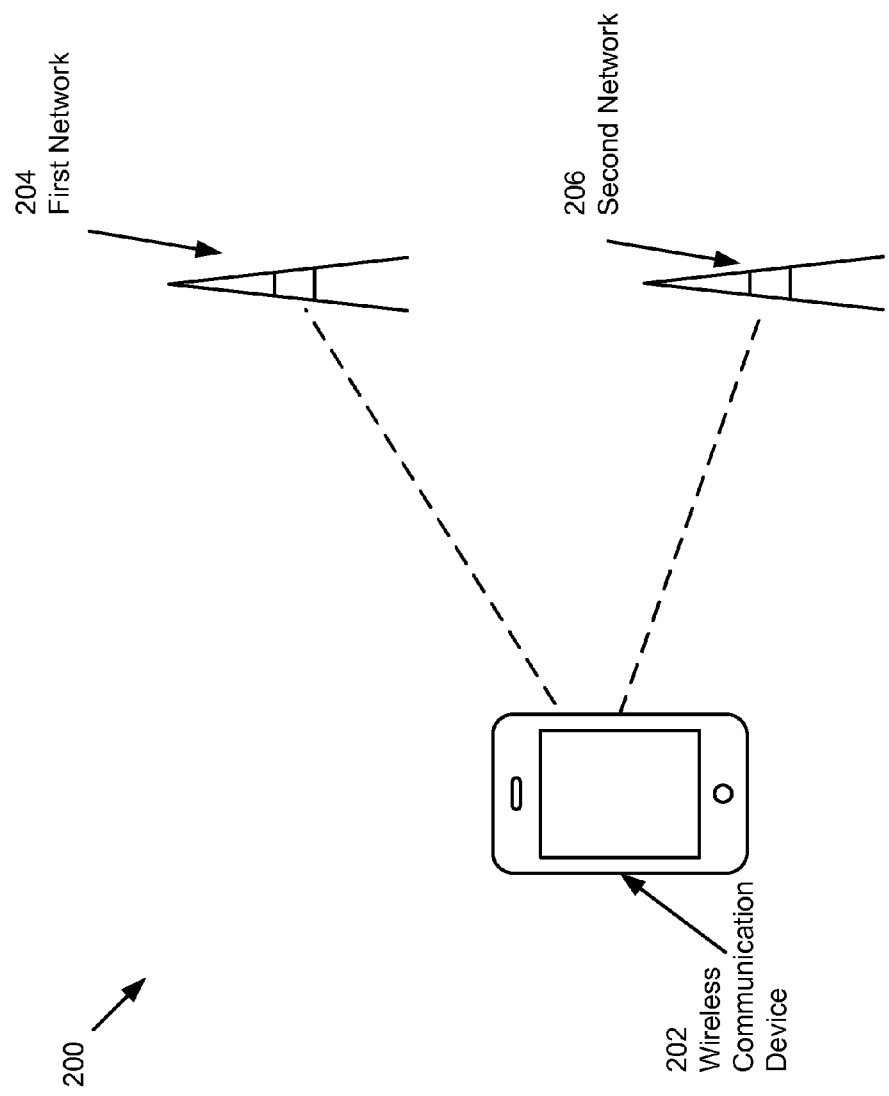
FIG. 2 illustrates a wireless communication system in accordance with some example embodiments.

FIG. 2 illustrates a wireless communication system 200 in accordance with some example embodiments. The system 200 can include a wireless communication device 202. By way of non-limiting example, the wireless communication device 202 can be a cellular phone, such as a smart phone device, a tablet computing device, a laptop computing device, or other computing device configured to support communication via one or more RATs, such as one or more cellular RATs. In some embodiments, such as some embodiments in which the wireless communication device 202 is configured to support communication via a network implementing an LTE RAT, such as an LTE network, an LTE-Advanced (LTE-A), and/or other present or future developed LTE RAT, the wireless communication device 202 can be referred to as user equipment (UE).

The wireless communication device 202 can be in an area of overlapping deployment of a first network 204 and a second network 206. The first network 204 and second network 206 can each implement any respective RAT. However, a RAT implemented by the first network 204 can be different than a RAT implemented by the second network 206.

In some example embodiments, the first network 204 can implement a RAT including a packet switched (PS) domain for supporting PS data sessions, but which does not include a circuit switched (CS) domain for supporting CS services, such as CS voice calls. Thus, for example, the second network 206 of some example embodiments, can implement an LTE RAT (e.g., LTE, LTE-A, and/or other present or future developed LTE RAT), and/or other fourth generation (4G) RAT an LTE or other 4G network, that does not include a CS domain.

In some example embodiments, the second network 206 can be a legacy network having a CS domain configured to support CS services, such as CS voice calls. By way of non-limiting example, the first network 204 can be a third generation (3G) network, such as a CDMA2000 1× network; a Universal Mobile Telecommunications System (UMTS), such as a Time Division Synchronous Code Division Multiple Access (TD-SCDMA) network or Wideband Code Division Multiple Access (WCDMA) network; or other 3G network. As a further example, the first network 204 can be a second Generation (2G) network, such as a Global System for Mobile Communications (GSM) network.

It will be appreciated, however, that the examples of the first network 204 implementing a RAT that does not include a CS domain and the second network 206 being a legacy network having a CS domain are provided by way of example, and not by way of limitation. In this regard, in some example embodiments, the first network 204 and second network 206 can each implement any respective RAT, so long as the RAT implemented by the first network 204 is different from the RAT implemented by the second network 206.

In some example embodiments, the wireless communication device 202 can use a single radio to support communication with both the first network 204 and the second network 206. For example, in some embodiments in which the first network 204 implements an LTE RAT, the wireless communication device 202 can be a Single Radio LTE (SRLTE) device.

The wireless communication device 202 can, in some instances, maintain parallel registration on both the first network 204 and the second network 206. Thus, for example, the wireless communication device 202 can have an active connection to the first network 204 and can, on occasion, tune-away from the first network 204 to the second network 206 for a tune-away period to listen for any messages or other signaling from the second network 206 that can be intended for the wireless communication device 202. For example, in some example embodiments in which the second network 206 is a CDMA2000 1× or other legacy network supporting CS services and the first network 204 is a PS network that does not include a CS domain and does not support circuit switched fallback (CSFB), the wireless communication device 202 can tune to the second network 206 to listen for a page message for a CS service, such as an incoming CS voice call.

In some example embodiments, the wireless communication device 202 and the first network 204 can agree on a mechanism to indicate that both parties (e.g., the wireless communication device 202 and the first network 204) support tune-away. However, while the first network 204 (e.g., an evolved node B (eNB) or other base station associated with the first network 204) can know when the wireless communication device 202 has tuned away from the first network 204, the first network 204 may not be able to anticipate the duration of the tune-away period, as the duration can depend on an extent of data communication (if any) between the wireless communication device 202 and the second network 206 during the tune-away period.

Figure 3:
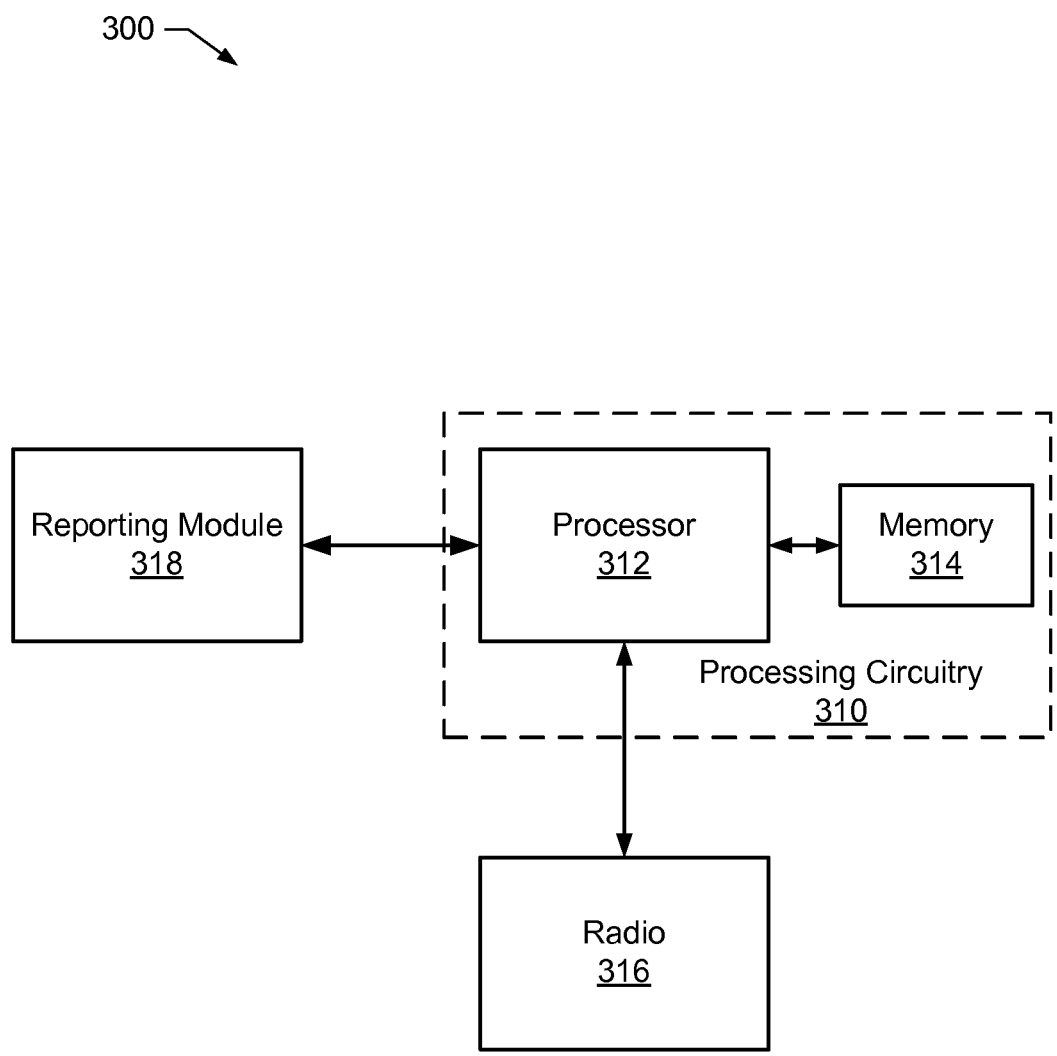
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the wireless communication device 202 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first network 204 and/or the second network 206. In accordance with some example embodiments, one or more components of the apparatus 300 can provide a cellular baseband chipset.

In some example embodiments, the processing circuitry 310 can include a processor 312 and, in some embodiments, such as that illustrated in FIG. 3, can further include memory 314. The processing circuitry 310 can be in communication with or otherwise control a radio 316, and/or reporting module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, radio 316, or reporting module 318 via a bus (or buses) for passing information among components of the apparatus 300.

The apparatus 300 can further include a radio 316. The radio 316 can be configured to enable the apparatus 300 to send wireless signals to and receive signals from both the first network 204 and the second network 206. In this regard, the apparatus 300 of some example embodiments can use a single radio to support communication via both a RAT implemented by the first network 204 and a RAT implemented by the second network 206. As such, the radio 316 can be configured to support any type of cellular or other wireless communication technology that may be implemented by the first network 204 and/or second network 206.

The apparatus 300 can further include reporting module 318. The reporting module 318 can be embodied as various means, such as circuitry, hardware, a computer program product comprising a computer readable medium (for example, the memory 314) storing computer readable program instructions that are executable by a processing device (for example, the processor 312), or some combination thereof. In some embodiments, the processor 312 (or the processing circuitry 310) can include, or otherwise control the reporting module 318. The reporting module 318 of some example embodiments can be configured to generate CSI reports for sending to the first network 204. In accordance with some example embodiments described further herein below, the reporting module 318 of some example embodiments can be configured to generate a CSI report based at least in part on a previously defined RI value known to the first network 204 in an instance in which a scheduled rank report is missed due to the scheduled rank report coinciding with a tune-away period.

Figure 4:
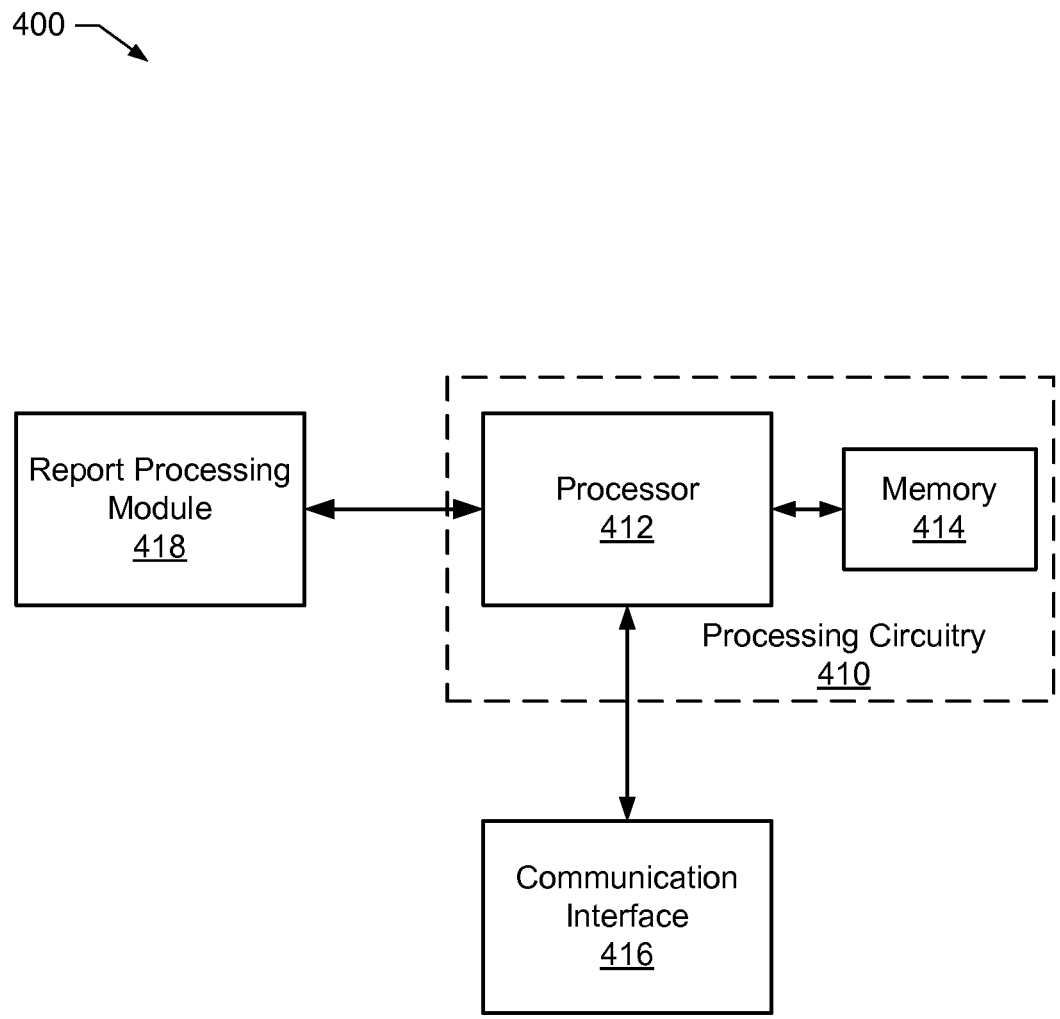
FIG. 4 illustrates a block diagram of an apparatus that can be implemented on a network entity that can process CSI reports in accordance with some example embodiments.

FIG. 4 illustrates a block diagram of an apparatus 400 that can be implemented on a network entity associated with the first network 204 that can process CSI reports and schedule resources for a wireless communication device 202 in accordance with some example embodiments. For example, the apparatus 400 can be implemented on a base station, such as an evolved node B (eNB), that can be associated with the first network 204, and which can communicate with the wireless communication device 202 to receive CSI reports that can be sent to the first network 204 by the wireless communication device 202. In some example embodiments, one or more components of the apparatus 400 can be distributed across multiple network entities that can be associated with the first network 204, which can be in operative communication with each other. For example, in some embodiments, a component(s) of the apparatus 400 can be implemented on one or more radio access network (RAN) entities and/or one or more core network entities associated with the first network 204. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of a network entity associated with the first network 204 in accordance with various example embodiments. The processing circuitry 410 can be configured to perform data processing, application execution and/or other processing and management services according to one or more example embodiments.

In some example embodiments, the processing circuitry 410 can include a processor 412 and, in some embodiments, such as that illustrated in FIG. 4, can further include memory 414. The processing circuitry 410 can be in communication with or otherwise control a communication interface 416, and/or report processing module 418.

The processor 412 can be embodied in a variety of forms. For example, the processor 412 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. In embodiments including a plurality of processors, the plurality of processors can be implemented on a single entity, or can be distributed across multiple entities that can be in operative communication with each other to perform functions of the first network 204. The plurality of processors can be in operative communication with each other and can be collectively configured to perform one or more functionalities of the apparatus 400 as described herein. In some example embodiments, the processor 412 can be configured to execute instructions that can be stored in the memory 414 or that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. Memory 414 can include fixed and/or removable memory devices. In embodiments including multiple memories, the memories can be implemented on a single entity, or can be distributed across multiple entities that can be in operative communication with each other to perform functions of the first network 204. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. In some embodiments, the memory 414 can be in communication with one or more of the processor 412, communication interface 416, or report processing module 418 via a bus (or buses) for passing information among components of the apparatus 400.

The apparatus 400 can further include a communication interface 416. The communication interface 416 can be configured to enable the apparatus 400 to send wireless signals to and receive signals from the wireless communication device 202. As such, the communication interface 416 can include one or more antennas, transceivers, and/or other hardware and/or supporting software for supporting communication between the first network 204 and the wireless communication device 202.

The apparatus 400 can further include report processing module 418. The report processing module 418 can be embodied as various means, such as circuitry, hardware, a computer program product comprising a computer readable medium (for example, the memory 414) storing computer readable program instructions that are executable by a processing device (for example, the processor 412), or some combination thereof. In some embodiments, the processor 412 (or the processing circuitry 410) can include, or otherwise control the report processing module 418. The report processing module 418 of some example embodiments can be configured to process (e.g., interpret) one or more CSI reports, such as a rank report(s), CQI report(s), PMI report(s), and/or the like, that can be sent by the wireless communication device 202. In some example embodiments, the report processing module 418 can be further configured to schedule resources for the wireless communication device 202 based at least in part on a processed CSI report received from the wireless communication device 202.

Figure 5:
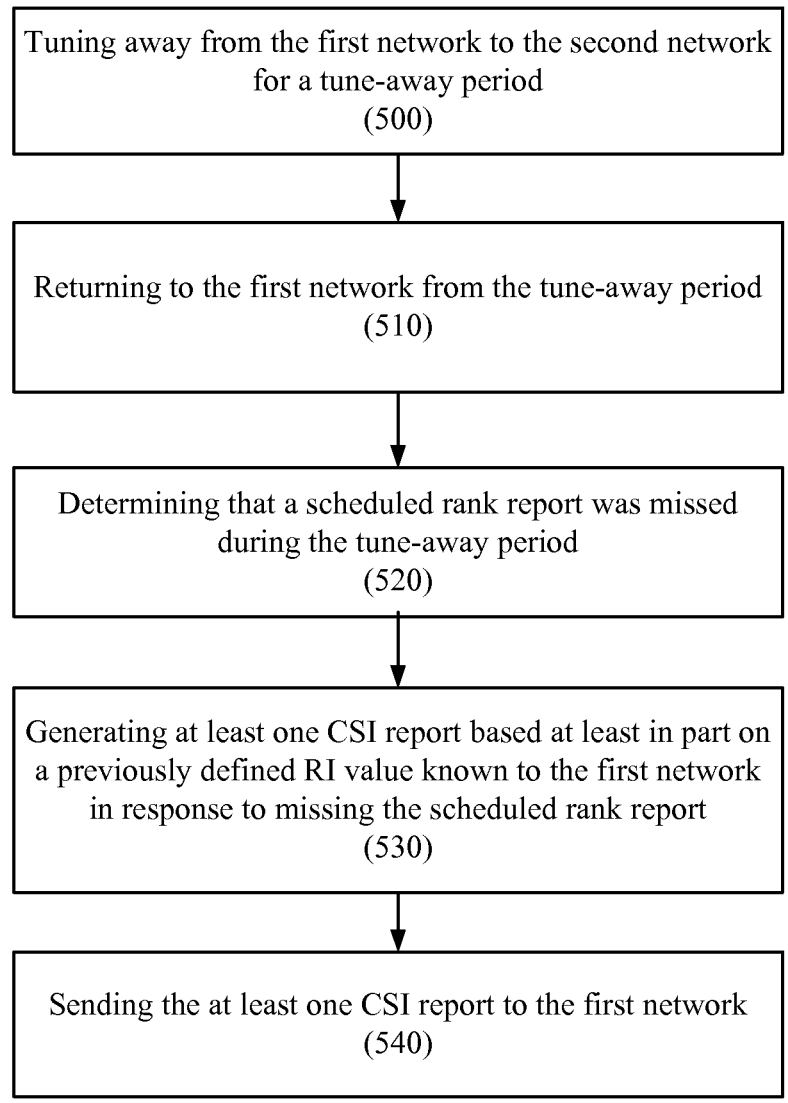
FIG. 5 illustrates a flowchart according to an example method for handling a missed rank report during a tune-away period according to some example embodiments.

FIG. 5 illustrates a flowchart according to an example method for handling a missed rank report during a tune-away period according to some example embodiments. In this regard, FIG. 5 illustrates operations that can be performed by a wireless communication device 202 in accordance with some example embodiments. One or more of processing circuitry 310, processor 312, memory 314, radio 316, or reporting module 318 can, for example, provide means for performing one or more of the operations illustrated in and described with respect to FIG. 5.

Operation 500 can include the wireless communication device 202 tuning away from the first network 204 to the second network 206 for a tune-away period. In this regard, for example, the wireless communication device 202 can tune the radio 316 away from the first network 204 to the second network 206. In some example embodiments, the apparatus 400 and/or other entity associated with the first network 204 can be configured to detect that the wireless communication device 202 has tuned away from the first network 204, and thus can be aware of the tune-away period. Operation 510 can include the wireless communication device 202 returning to the first network 204 from the tune-away period. In this regard, for example, the wireless communication device 202 can tune the radio 316 back to the first network 204 to return from the tune-away period.

In an instance in which a scheduled rank report did not collide with the tune-away period such that a rank report was missed, the method can terminate, and operations 520-540 can be omitted. However, in an instance in which a rank report was missed due to the tune-away period, the method can include operation 520, which can include the wireless communication device 202 determining that a scheduled rank report was missed during the tune-away period.

While illustrated as occurring after operation 510, it will be appreciated that operation 520 can be performed in parallel with operation 510 and/or can be performed during the tune-away period prior to returning to the first network 204 in accordance with some example embodiments. In this regard, it will be appreciated that operations illustrated and described with respect to FIG. 5 and the other flow charts can be performed in multiple orderings. Additionally or alternatively in some example embodiments, multiple operations can be combined into a single operation and/or an operation can be split into multiple operations. As such, it will be appreciated that the flow charts are provided by way of example to enable understanding of various example embodiments, and are not provided by way of limitation.

Operation 530 can include the wireless communication device 202 generating at least one CSI report based at least in part on a previously defined RI value known to the first network 204 in response to missing the scheduled rank report. In this regard, rather than generating the at least one CSI report based on the current RI value that would have otherwise been reported in the scheduled rank report if not for the tune-away period, the wireless communication device 202 can generate one or more CSI reports based on a previously defined RI value known to the first network 204 such that the first network 204 can interpret CSI reports received after the tune-away period and prior to the next scheduled rank report. Accordingly, the first network 204 can schedule resources (if available) for the wireless communication device 202 more quickly after the wireless communication device 202 has returned from the tune-away period without waiting for the next scheduled rank report. The at least one CSI report generated attendant to performance of operation 530 can, for example, include one or more PMI reports and/or one or more CQI reports.

In some example embodiments, the previously defined RI value known to the first network 204 can be a last RI value reported to the first network 204 prior to the tune-away period. In some such example embodiments, the wireless communication device 202 and first network 204 can agree prior to the tune-away period (e.g., through a handshaking process) to use the last reported RI value before tune-away in an instance in which a scheduled rank report is missed due to a tune-away period. For example, in some example embodiments, the wireless communication device 202 and first network 204 can agree to use a last reported RI value for CSI report generation and interpretation in an instance in which a scheduled rank report is missed due to a tune-away period during Radio Resource Control (RRC) connection establishment. Since the first network 204 can be aware of the start of the tune-away period, the first network 204 can accordingly correctly interpret a CSI report(s) generated by the wireless communication device 202 based on a last reported RI value.

As another example, in some example embodiments, the previously defined RI value known to the first network 204 can be a default RI value agreed to and/or otherwise known to both the wireless communication device 202 and the first network 204. In this regard, the default RI value can function as a rank-override, such that in an instance in which a scheduled rank report is missed due to a tune-away period, the RI value can be overridden to the default RI value. It will be appreciated that the default RI value can be any RI value that can be agreed to between and/or otherwise known to both the wireless communication device 202 and the first network 204. By way of non-limiting example, in some embodiments, the default RI value can be a smallest possible RI value (e.g., RI=1). In this regard, RI=1 can provide for more robust scheduling in different channel conditions, as the smallest value of RI report can achieve good performance in a variety of channel and signal-to-noise ratio (SNR) conditions.

Operation 540 can include the wireless communication device 202 sending the at least one CSI report to the first network 204. The sent CSI report(s) can, for example, be sent to the first network 204 in a scheduled subframe(s) on PUCCH.

Figure 6:
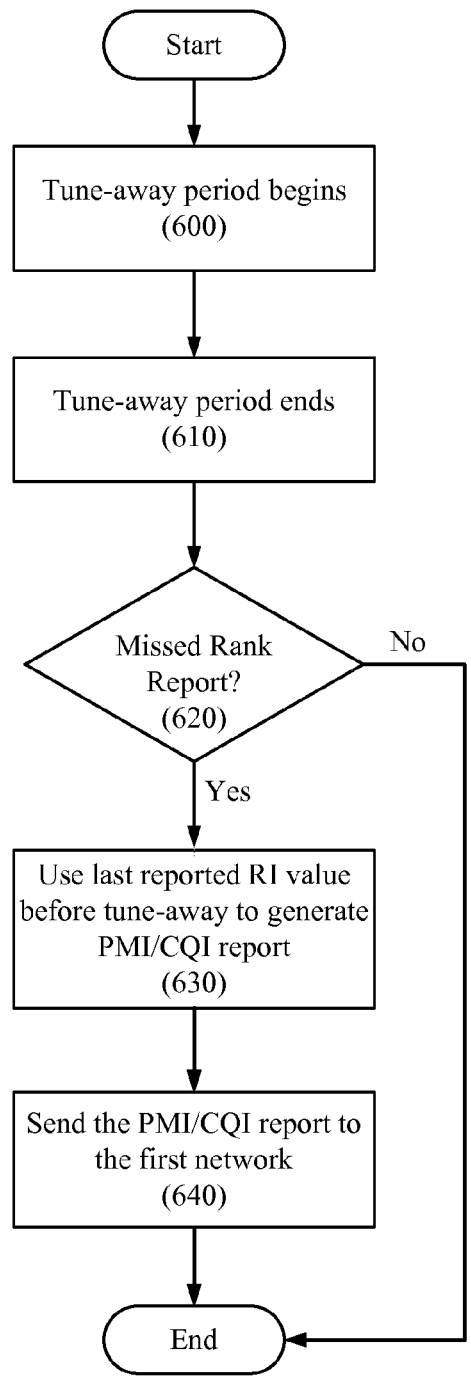
FIG. 6 illustrates a flowchart according to an example method for handling a missed rank report during a tune-away period by using the last reported RI value before a tune-away period to generate a CSI report according to some example embodiments.

FIG. 6 illustrates a flowchart according to an example method for handling a missed rank report during a tune-away period by using the last reported RI value before a tune-away period to generate a CSI report according to some example embodiments. In this regard, FIG. 6 illustrates an example embodiment of the method of FIG. 5 in which a last reported RI value can be used by the wireless communication device 202 to generate a CSI report in an instance in which a scheduled rank report is missed during a tune-away period. One or more of processing circuitry 310, processor 312, memory 314, radio 316, or reporting module 318 can, for example, provide means for performing one or more of the operations illustrated in and described with respect to FIG. 6.

Operation 600 can include a tune-away period beginning. In this regard, operation 600 can correspond to an embodiment of operation 500. Operation 610 can include the tune-away period ending. In this regard, operation 610 can correspond to an embodiment of operation 510.

Operation 620 can include the wireless communication device 202 determining whether a rank report was missed during the tune-away period. In an instance in which a rank report was not missed, the method can terminate. However, if a rank report was missed, the method can further include operations 630 and 640. In this regard, operation 620 can correspond to an embodiment of operation 520.

Operation 630 can include the wireless communication device 202 using the last reported RI value before the tune-away period to generate a PMI/CQI report. Operation 630 can accordingly correspond to an embodiment of operation 530. Operation 640 can include the wireless communication device 202 sending the PMI/CQI report generated in operation 630 to the first network 204. In this regard, operation 640 can correspond to an embodiment of operation 530.

Figure 7:
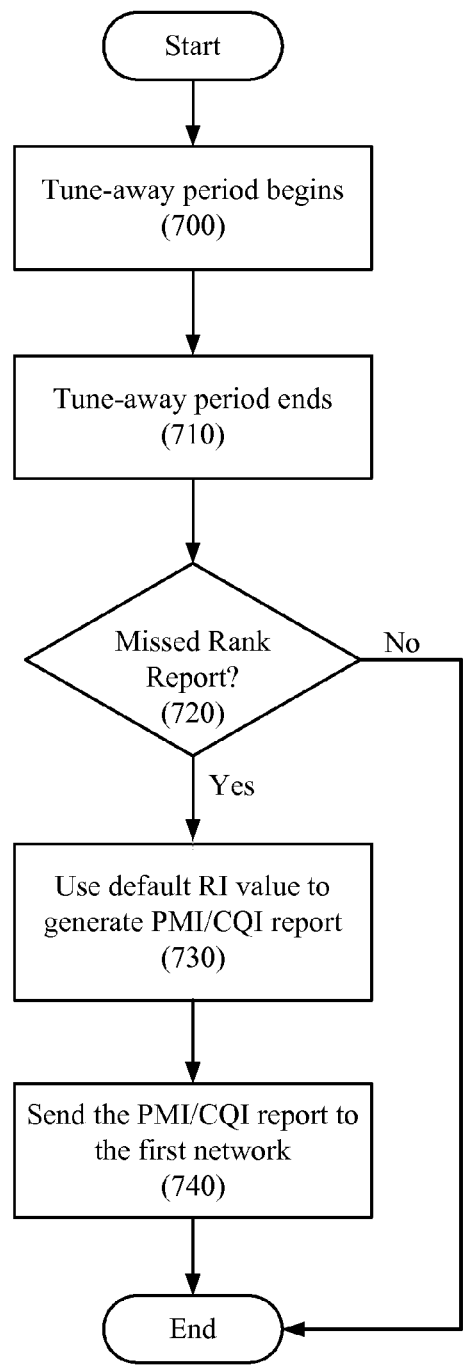
FIG. 7 illustrates a flowchart according to an example method for handling a missed rank report during a tune-away period by using a default RI value to generate a CSI report according to some example embodiments.

FIG. 7 illustrates a flowchart according to an example method for handling a missed rank report during a tune-away period by using a default RI value to generate a CSI report according to some example embodiments. In this regard, FIG. 7 illustrates an example embodiment of the method of FIG. 5 in which a default RI value can be used by the wireless communication device 202 to generate a CSI report in an instance in which a scheduled rank report is missed during a tune-away period. One or more of processing circuitry 310, processor 312, memory 314, radio 316, or reporting module 318 can, for example, provide means for performing one or more of the operations illustrated in and described with respect to FIG. 7.

Operation 700 can include a tune-away period beginning. In this regard, operation 700 can correspond to an embodiment of operation 500. Operation 710 can include the tune-away period ending. In this regard, operation 710 can correspond to an embodiment of operation 510.

Operation 720 can include the wireless communication device 202 determining whether a rank report was missed during the tune-away period. In an instance in which a rank report was not missed, the method can terminate. However, if a rank report was missed, the method can further include operations 730 and 740. In this regard, operation 720 can correspond to an embodiment of operation 520.

Operation 730 can include the wireless communication device 202 using the default RI value to generate a PMI/CQI report. The default RI value can be any RI value agreed to between and/or otherwise known to both the wireless communication device 202 and the first network 204. In some example embodiments, the default RI value can be 1. Operation 730 can accordingly correspond to an embodiment of operation 530. Operation 740 can include the wireless communication device 202 sending the PMI/CQI report generated in operation 730 to the first network 204. In this regard, operation 740 can correspond to an embodiment of operation 530.

Figure 8:
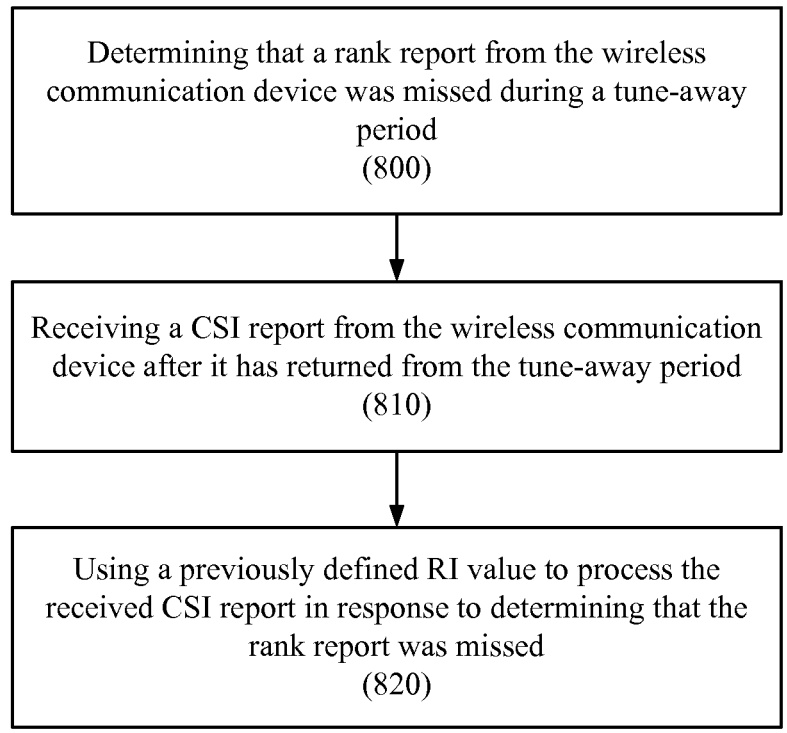
FIG. 8 illustrates a flowchart according to an example method that can be implemented by a network entity for handling a missed rank report during a tune-away period according to some example embodiments.

FIG. 8 illustrates a flowchart according to an example method that can be implemented by a network entity associated with the first network 204, such as apparatus 400, for handling a missed rank report during a tune-away period according to some example embodiments. One or more of processing circuitry 410, processor 412, memory 414, communication interface 416, or report processing module 418 can, for example, provide means for performing one or more of the operations illustrated in and described with respect to FIG. 8.

Operation 800 can include determining that a scheduled rank report from the wireless communication device 202 was missed during a tune-away period. In this regard, the first network 204 can, in some embodiments, be aware of the start of the tune-away period. As such, in some such embodiments, if a rank report is missed subsequent to the start of the tune-away period, the first network 204 can assume that the rank report was missed due to collision with the tune-away period.

Operation 810 can include receiving a CSI report from the wireless communication device 202 after it has returned from the tune-away period. Operation 820 can include using a previously defined RI value to process the received CSI report in response to determining that the rank report was missed. The previously defined RI value can be any RI value that can be specified in accordance with network specifications and/or otherwise agreed to and known to both the wireless communication device 202 and the first network 204. Thus, for example, the previously defined RI value can be a last RI value reported by the wireless communication device 202 prior to the tune-away period or a default RI value, as described above in the examples of FIGS. 5-7.

In some example embodiments, a hybridization of the usage of a last reported RI value and a default RI value can be used. In this regard, while a RI value can change more slowly relative to other CSI values, such as PMI and CQI, a last reported RI value can be less likely to be an accurate representation of a current channel state as time goes on, and a default RI value can provide for more robust scheduling given the possibility of changed channel conditions. Thus, in some example embodiments if the duration of a tune-away period exceeds a threshold duration, a default RI value can be used. However, if the duration of the tune-away period does not exceed the threshold duration, the last reported RI value can be used. The length of the threshold duration can be selected to represent an amount of time in which channel conditions are not likely to change significantly enough such that a last reported RI value is not likely to be an acceptably accurate representation of the current channel state.

Figure 9:
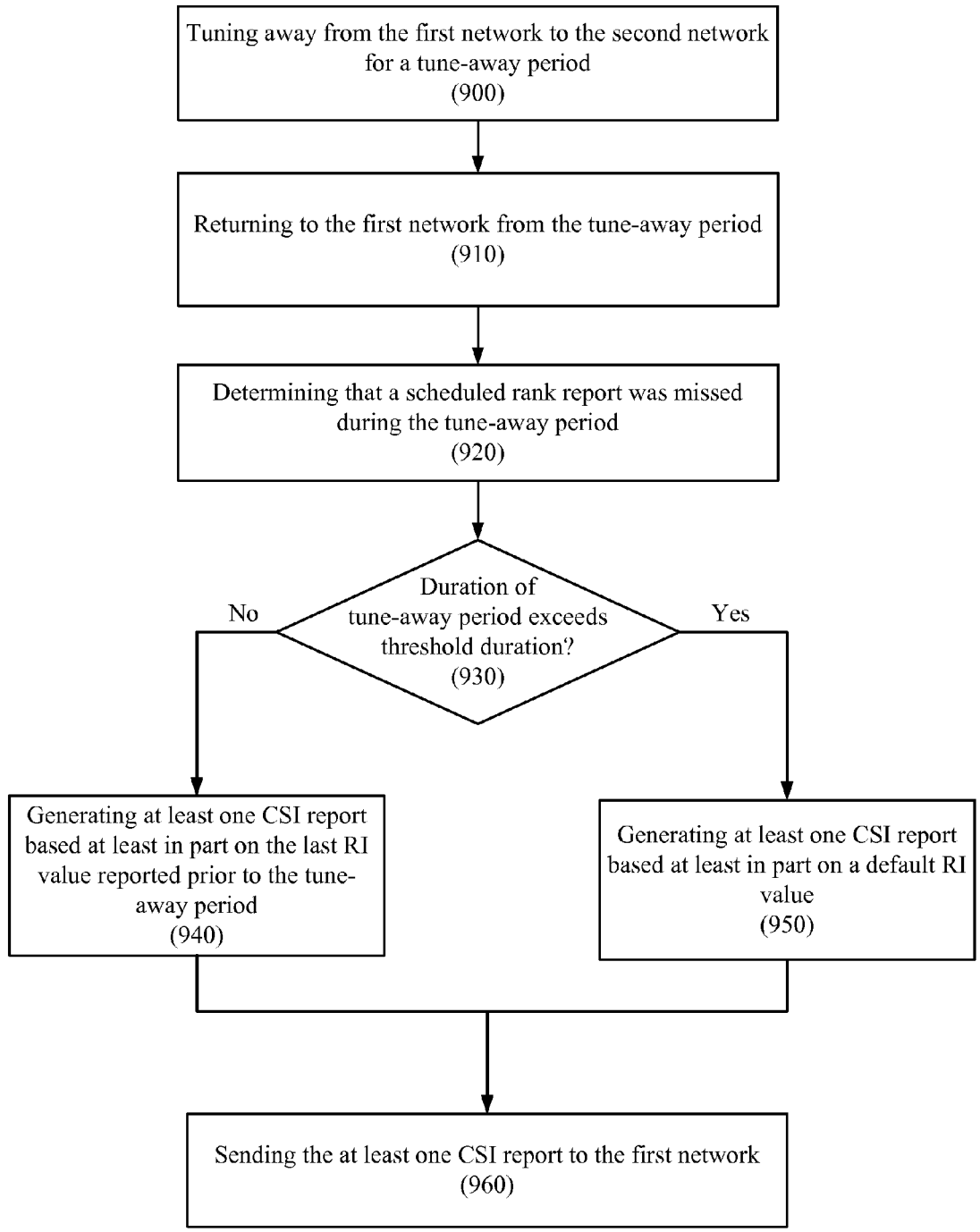
FIG. 9 illustrates a flowchart according to another example method for handling a missed rank report during a tune-away period according to some example embodiments.

FIG. 9 illustrates a flowchart according to another example method for handling a missed rank report during a tune-away period according to some example embodiments. In this regard, FIG. 9 illustrates operations that can be performed by a wireless communication device 202 in accordance with some example embodiments. One or more of processing circuitry 310, processor 312, memory 314, radio 316, or reporting module 318 can, for example, provide means for performing one or more of the operations illustrated in and described with respect to FIG. 9.

Operation 900 can include the wireless communication device 202 tuning away from the first network 204 to the second network 206 for a tune-away period. Operation 910 can include the wireless communication device 202 returning to the first network 204 from the tune-away period. Operation 920 can include the wireless communication device 202 determining that a scheduled rank report was missed during the tune-away period.

Operation 930 can include the wireless communication device 202 determining whether the duration of the tune-away period exceeds the threshold duration. The length of the threshold duration can be selected to represent an amount of time in which channel conditions are not likely to change significantly enough such that a last reported RI value is not likely to be an acceptably accurate representation of the current channel state. The length of the threshold duration can be known to the first network 204 as well so that the first network 204 can determine which RI value is used by the wireless communication device 202 to generate a CSI report. In some example embodiments, a timer T having a period equal to the threshold duration can be set in response to the tune-away and can be used to determine if the duration of the tune-away period exceeds the threshold duration.

In some example embodiments, the threshold duration can be a static value, such as, by way of non-limiting example, 200 milliseconds or 400 milliseconds. It will be appreciated, however, that in embodiments in which a static value is used, the static value can be any value that can be known to both the wireless communication device 202 and the first network 204.

However, in some example embodiments, the length of the threshold duration can be dynamically defined based on present conditions. For example, the threshold duration can be defined based on present network conditions, mobility conditions (e.g., velocity) for the wireless communication device 202, measured fading conditions, Doppler channel estimation, and/or other conditions that can be used to estimate a length of time for which a last reported RI value can provide an acceptably accurate representation of a current channel state. Thus, for example, if the wireless communication device 202 is in a fast mobility condition and/or is experiencing a fast fading condition, a shorter threshold duration can be used than if the wireless communication device 202 is not in a mobility state. In some embodiments in which a dynamic threshold duration is used, the wireless communication device 202 can report its current threshold duration to the first network 204 prior to a tune-away period.

In an instance in which it is determined at operation 930 that the duration of the tune-away period does not exceed the threshold duration, the method can proceed to operation 940, which can include the wireless communication device 202 generating at least one CSI report based at least in part on the last RI value reported prior to the tune-away period. If, however, it is determined at operation 940 that the duration of the tune-away period exceeds the threshold duration, the method can instead proceed to operation 950, which can include the wireless communication device 202 generating at least one CSI report based at least in part on a default RI value.

Operation 960 can include the wireless communication device 202 sending the at least one CSI report generated in operation 940 or operation 950 to the first network 204. The at least one CSI report can, for example, be sent on PUCCH.

Figure 10:
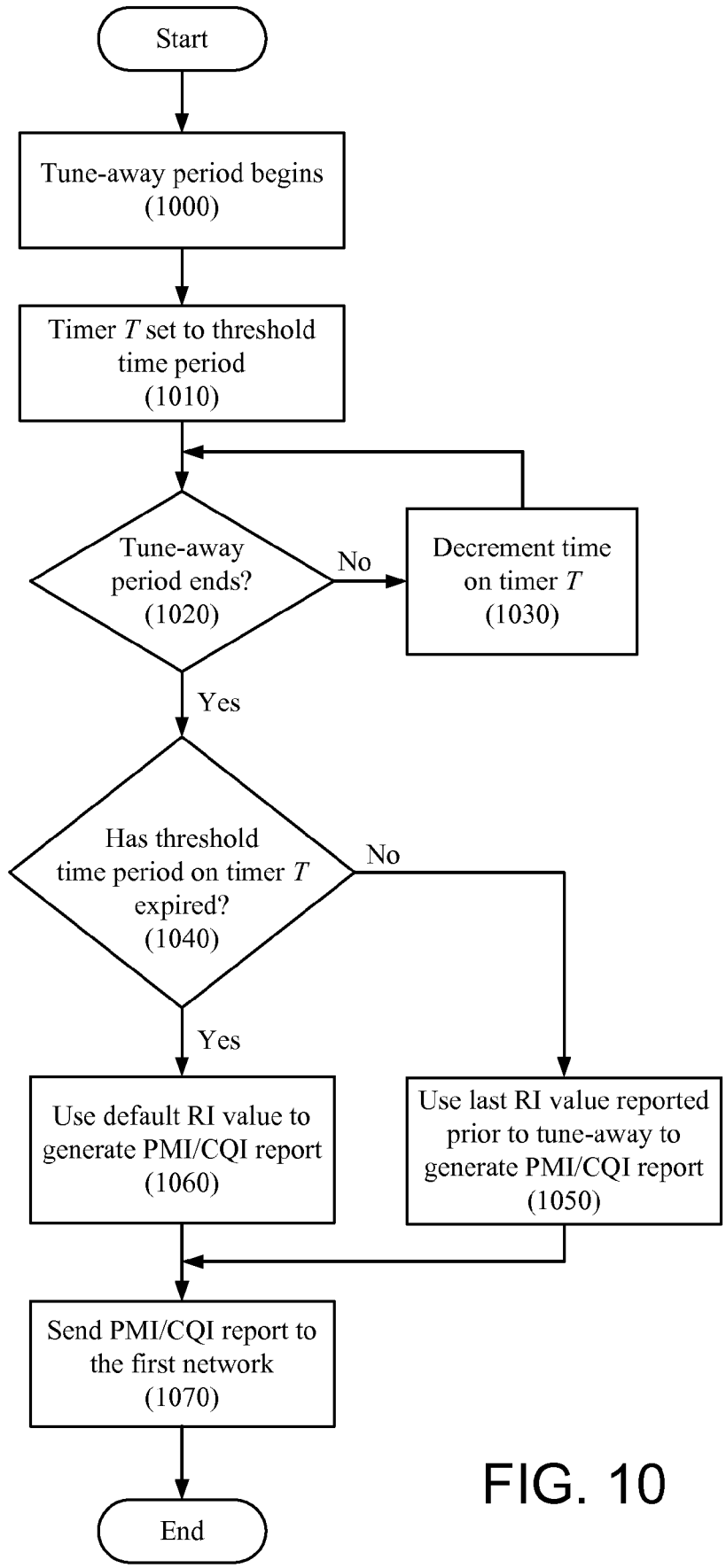
FIG. 10 illustrates a flowchart according to a further example method for handling a missed rank report during a tune-away period according to some example embodiments.

FIG. 10 illustrates a flowchart according to a further example method for handling a missed rank report during a tune-away period according to some example embodiments. In this regard, FIG. 10 illustrates an embodiment of the method of FIG. 9 in which a timer T can be applied to determine if the duration of the tune-away period exceeds the threshold duration. One or more of processing circuitry 310, processor 312, memory 314, radio 316, or reporting module 318 can, for example, provide means for performing one or more of the operations illustrated in and described with respect to FIG. 10.

The wireless communication device 202 can tune-away from the first network 204 to the second network 206, and the tune-away period can begin, at operation 1000. In response to the tune-away period beginning, the wireless communication device 1010 can set the timer T to the threshold time period, at operation 1010. Operations 1020-1030 can include the wireless communication device 202 decrementing the time on the timer T until the end of the tune-away period.

After the end of the tune-away period, the wireless communication device 202 can determine whether the threshold time period on timer T has expired (e.g., whether the duration of the tune-away period exceeded the threshold duration), at operation 1040. In an instance in which the timer T has not expired, the method can proceed to operation 1050, which can include the wireless communication device 202 using the last RI value reported to the first network 204 prior to the tune-away to generate a PMI and/or CQI report(s). If, however, the timer T has expired, the method can instead proceed to operation 1060, which can include the wireless communication device 202 using the default RI value to generate the PMI/CQI report(s).

Operation 1070 can include the wireless communication device 202 sending the PMI/CQI report(s) generated in operation 1050 or operation 1060 to the first network 204. The PMI/CQI report(s) can, for example, be sent on PUCCH.

Figure 11:
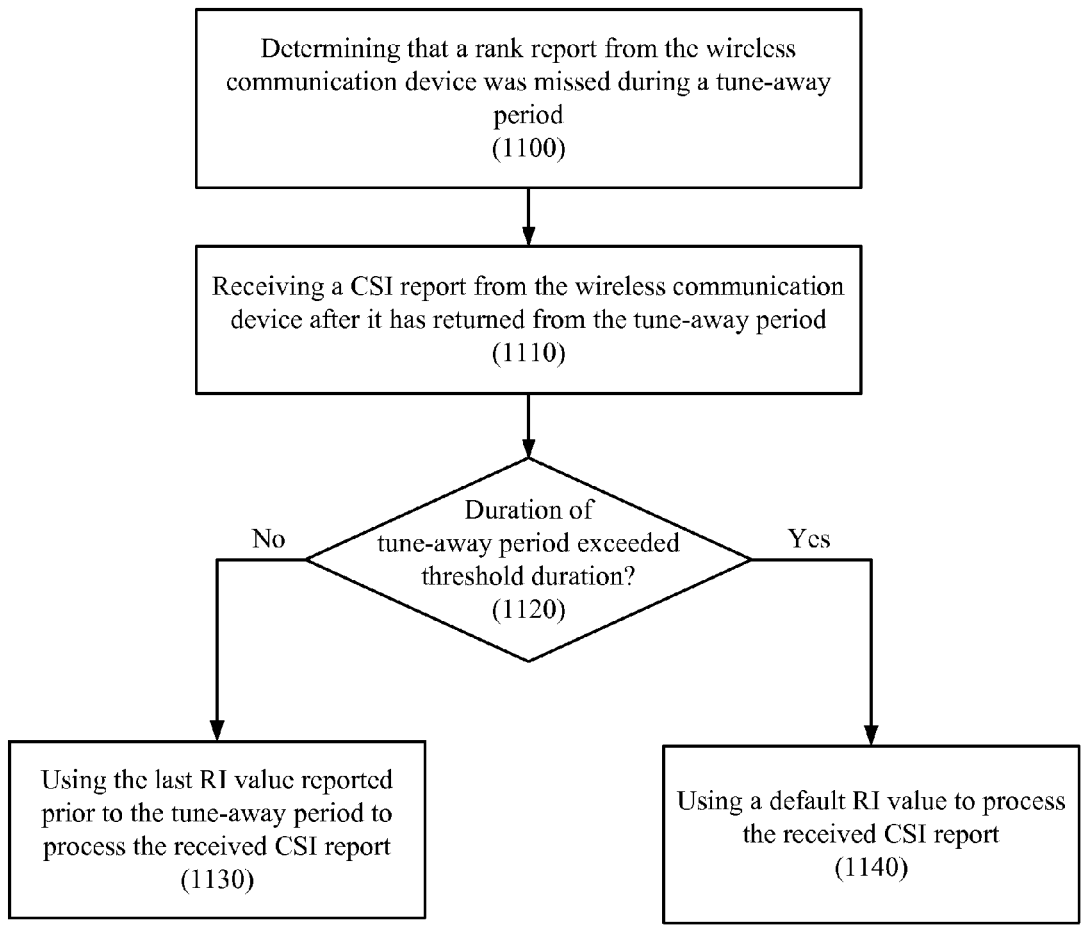
FIG. 11 illustrates a flowchart according to another example method that can be implemented by a network entity for handling a missed rank report during a tune-away period according to some example embodiments.

FIG. 11 illustrates a flowchart according to another example method that can be implemented by a network entity associated with the first network 204, such as apparatus 400, for handling a missed rank report during a tune-away period according to some example embodiments. More particularly, FIG. 11 illustrates an example method that can be implemented by a network entity in some example embodiments (e.g., those embodiments illustrated in and described with respect to FIGS. 9 and 10) in which the wireless communication device 202 can select to use a default RI value or a last reported RI value dependent on a duration of the tune-away period. One or more of processing circuitry 410, processor 412, memory 414, communication interface 416, or report processing module 418 can, for example, provide means for performing one or more of the operations illustrated in and described with respect to FIG. 11.

Operation 1100 can include determining that a scheduled rank report from the wireless communication device 202 was missed during a tune-away period. In this regard, the first network 204 can, in some embodiments, be aware of the start of the tune-away period. As such, in some such embodiments, if a rank report is missed subsequent to the start of the tune-away period, the first network 204 can assume that the rank report was missed due to collision with the tune-away period.

Operation 1110 can include receiving a CSI report from the wireless communication device 202 after it has returned from the tune-away period. Operation 1120 can include determining whether the duration of the tune-away period exceeded the threshold duration. In some example embodiments, a timer T can be set at the start of the tune-away period and used by the network 204 to make this determination.

In an instance in which it is determined at operation 1120 that the duration of the tune-away period did not exceed the threshold duration, the method can proceed to operation 1130, which can include the first network 204 using the last RI value reported by the wireless communication device 202 prior to the tune-away period to process the received CSI report. If, however, it is determined at operation 1120 that the duration of the tune-away period did exceed the threshold duration, the method can instead proceed to operation 1140, which can include the first network 204 using the default RI value to process the received CSI report.

Figure 12:
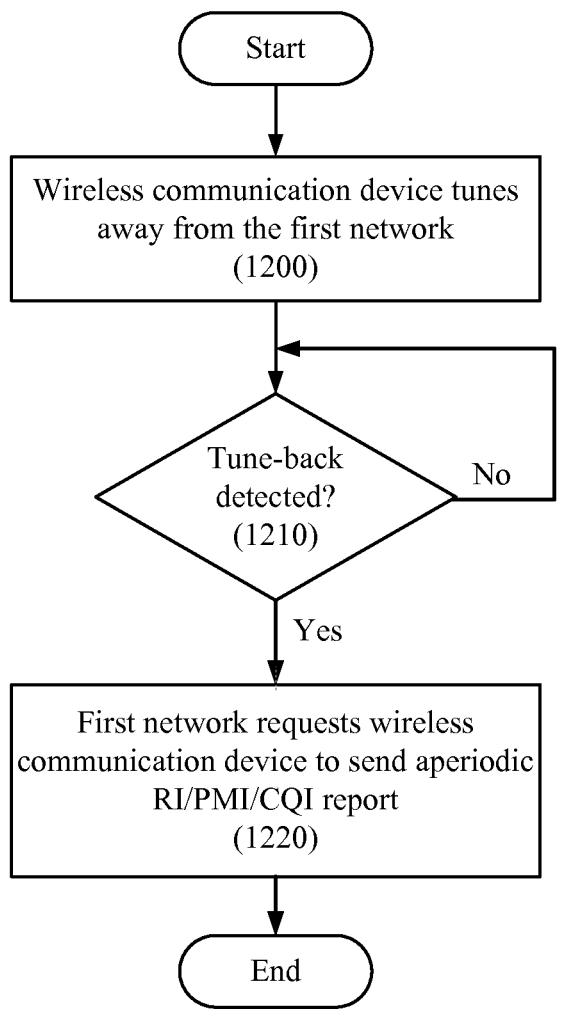
FIG. 12 illustrates a flowchart according to an example method that can be implemented by a network entity for handling a missed rank report during a tune-away period by requesting an aperiodic CSI report according to some example embodiments.

In some example embodiments, the first network 204 (e.g., apparatus 400) can be configured to request the wireless communication device 202 to send an aperiodic CSI report in an instance in which a rank report is missed during a tune-away period. The aperiodic CSI report can, for example, contain all CSI reports (e.g., RI, PMI, and CQI) in a single sub-frame that can be sent on a Physical Uplink Shared Channel (PUSCH). FIG. 12 illustrates a flowchart according to an example method that can be implemented by a network entity associated with the first network 204, such as apparatus 400, according to some such example embodiments. One or more of processing circuitry 410, processor 412, memory 414, communication interface 416, or report processing module 418 can, for example, provide means for performing one or more of the operations illustrated in and described with respect to FIG. 12.

Operation 1200 can include the first network 204 determining that the wireless communication device 202 has performed a tune-away form the first network 204. The first network 204 can wait to detect tune-back, at operation 1210. In response to detecting that the wireless communication device 202 has returned to the first network 204, the first network 204 can request the wireless communication device 202 to send an aperiodic RI/PMI/CQI report, at operation 1220. The aperiodic RI/PMI/CQI report can, for example, be received in a single sub-frame on PUSCH.

Figure 13:
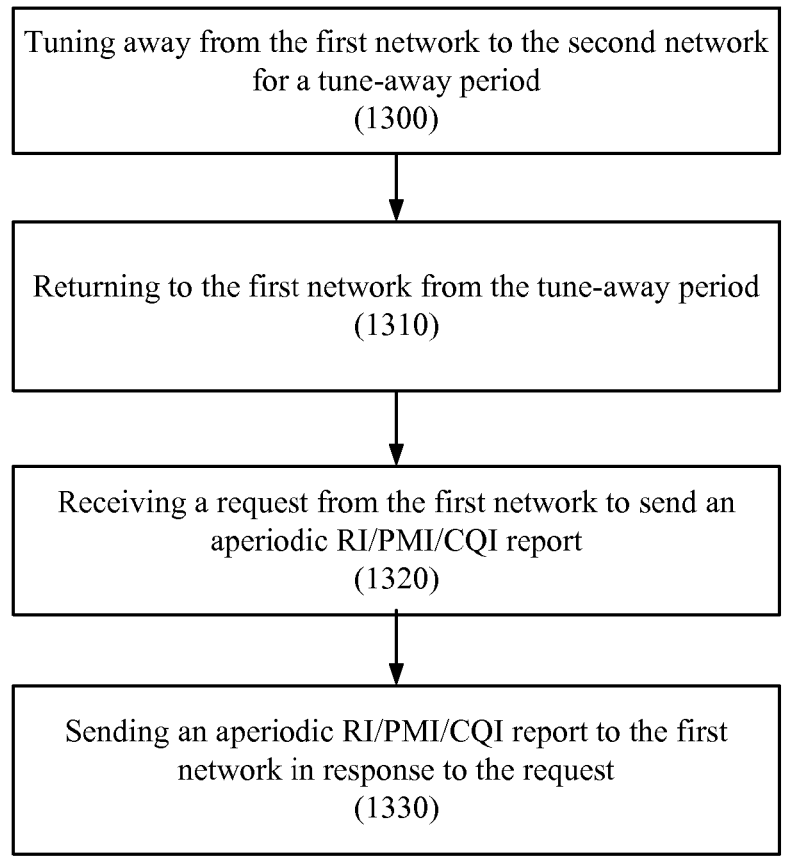
FIG. 13 illustrates a flowchart according to an example method that can be implemented by a wireless communication device for handling a missed rank report during a tune-away period by sending an aperiodic CSI report according to some example embodiments.

FIG. 13 illustrates a flowchart according to an example method that can be implemented by wireless communication device 102 for handling a missed rank report during a tune-away period by sending an aperiodic CSI report in response to a network request according to some example embodiments. One or more of processing circuitry 310, processor 312, memory 314, radio 316, or reporting module 318 can, for example, provide means for performing one or more of the operations illustrated in and described with respect to FIG. 13.

Operation 1300 can include the wireless communication device 202 tuning away from the first network 204 to the second network 204 for a tune-away period. Operation 1310 can include the wireless communication device 202 returning to the first network 204 from the tune-away period. Operation 1320 can include the wireless communication device 202 receiving a request from the first network 204 to send an aperiodic RI/PMI/CQI report. Operation 1330 can include the wireless communication device 202 sending an aperiodic RI/PMI/CQI report to the first network 204 in response to the request. The aperiodic RI/PMI/CQI can, for example, be sent in a single sub-frame on PUSCH.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method comprising:
by a wireless communication device:
tuning away from a first network to a second network for a tune-away period, the first network implementing a Long Term Evolution (LTE) radio access technology (RAT);
returning to the first network from the tune-away period;
determining that a sending of a scheduled rank report to the first network was not performed by the wireless communication device during the tune-away period;
generating at least one Channel State Indicator (CSI) report based on a previously defined Rank Indicator (RI) value known to the first network to allow the first network to interpret the at least one CSI report, wherein the generating is in response to the not performing of the sending of the scheduled rank report to the first network; and
sending the at least one CSI report to the first network.

2. The method of claim 1, wherein the previously defined RI value known to the first network is a last RI value reported by the wireless communication device to the first network prior to the tune-away period.

3. The method of claim 2, further comprising:
performing, prior to the tuning away, a handshaking process with the first network to agree on a CSI report generation method to be used after tune-away events.

4. The method of claim 1, wherein the previously defined RI value known to the first network is a default RI value.

5. The method of claim 4, wherein the default RI value is 1.

6. The method of claim 4, further comprising:
performing, prior to the tuning away, a handshaking process with the first network during a radio resource control (RRC) connection establishment process to agree on a CSI report generation method to be used after tune-away events.

7. The method of claim 1, wherein:
generating the at least one CSI report further comprises generating a Precoding Matrix Indicator (PMI) report and generating a Channel Quality Indicator (CQI) report; and
sending the at least one CSI report to the first network further comprises sending the PMI report to the first network and sending the CQI report to the first network.

8. The method of claim 1, further comprising the wireless communication device:
determining whether a duration of the tune-away period is greater than a threshold duration;
wherein generating the at least one CSI report based on the previously defined RI value comprises:
generating the at least one CSI report based on a last RI value reported to the first network prior to the tune-away period in an instance in which it is determined that the duration of the tune-away period is not greater than the threshold duration; and
generating the at least one CSI report based on a default RI value in an instance in which it is determined that the duration of the tune-away period is greater than the threshold duration.

9. The method of claim 1, wherein sending the at least one CSI report to the first network comprises sending the at least one CSI report to the first network on a Physical Uplink Control Channel (PUCCH).

10. The method of claim 1, wherein the second network is a Code Division Multiple Access 2000 (CDMA2000) 1× network.

11. A wireless communication device comprising:
a radio configured to support communication with a first network and with a second network; and
processing circuitry coupled to the radio, the processing circuitry configured to control the wireless communication device to at least:
tune the radio away from the first network to the second network for a tune-away period;
tune the radio back to the first network to return from the tune-away period;
determine that a sending of a scheduled rank report to the first network was not performed by the wireless communication device during the tune-away period;
generate, in response to the not performing of the sending of the scheduled rank report, at least one Channel State Indicator (CSI) report based on a previously defined Rank Indicator (RI) value known to the first network to allow the first network to interpret the at least one CSI report; and
send the at least one CSI report to the first network.

12. The wireless communication device of claim 11, wherein the previously defined RI value known to the first network is a last RI value reported by the wireless communication device to the first network prior to the tune-away period.

13. The wireless communication device of claim 11, wherein the previously defined RI value known to the first network is a default RI value.

14. The wireless communication device of claim 11, wherein the processing circuitry is further configured to control the wireless communication device to:
generate the at least one CSI report at least in part by controlling the wireless communication device to generate a Precoding Matrix Indicator (PMI) report and to generate a Channel Quality Indicator (CQI) report; and
send the at least one CSI report to the first network at least in part by controlling the wireless communication device to send the PMI report to the first network and to send the CQI report to the first network.

15. The wireless communication device of claim 11, wherein the processing circuitry is further configured to control the wireless communication device to:
determine whether a duration of the tune-away period is greater than a threshold duration; and
generate the at least one CSI report based on the previously defined RI value at least in part by controlling the wireless communication device to:
generate the at least one CSI report based on a last RI value reported to the first network prior to the tune-away period in an instance in which it is determined that the duration of the tune-away period is not greater than the threshold duration; and
generate the at least one CSI report based on a default RI value in an instance in which it is determined that the duration of the tune-away period is greater than the threshold duration.

16. The wireless communication device of claim 11, wherein the first network is a network implementing a Long Term Evolution (LTE) radio access technology (RAT), and wherein the processing circuitry is further configured to control the wireless communication device to send the at least one CSI report to the first network at least in part by controlling the wireless communication device to send the at least one CSI report to the first network on a Physical Uplink Control Channel (PUCCH).

17. The wireless communication device of claim 11, wherein the second network is a Code Division Multiple Access 2000 (CDMA2000) 1× network.

18. A computer program product comprising at least one non-transitory computer readable storage medium having computer program code stored thereon, that when executed by a processor in a wireless communication device causes the wireless communication device to:

tune away from a first network to a second network for a tune-away period;

return to the first network from after the tune-away period;

determine that a sending of a scheduled rank report to the first network was not performed by the wireless communication device during the tune-away period;

generate, in response to the not performing of the sending of the scheduled rank report, at least one Channel State Indicator (CSI) report based on a previously defined Rank Indicator (RI) value known to the first network to allow the first network to interpret the at least one CSI report; and send the at least one CSI report to the first network.

19. The computer program product of claim 18, wherein the previously defined RI value known to the first network is a last RI value reported by a wireless communication device to the first network prior to the tune-away period.

20. The computer program product of claim 18, wherein the previously defined RI value known to the first network is a default RI value.

* * * * *